United States Patent Office 2,979,438
Patented Apr. 11, 1961

2,979,438

EXTRACTION OF COLLAGEN

John H. Highberger, Marblehead, Mass., assignor to United Shoe Machinery Corporation, Flemington, N.J., a corporation of New Jersey No Drawing. Filed Aug. 7, 1958, Ser. No. 753,603

3 Claims. (Cl. 195—4)

This invention relates to a process for forming collagenous extracts.

Collagen, one of the most important structural proteins of the animal body, is widely distributed in most tissues in which it serves as a structural element. Aside from its importance within an animal organism for the building, maintenance or repair of various parts of an animal body, collagen is the important fibrous component of hides and skins which when tanned gives the valuable product known as leather.

Collagen is extractable in soluble form from certain types of connective tissue. At the present time it appears that the collagen solutions extracted from these various sources possess similar properties. Thus the dissolved collagen may be reconstituted, that is, may be precipitated from solution in the structured form (as observed in the electron microscope) of collagen fibrils by various means including dialysis of the collagen solution against water or by addition of certain precipitating agents. While the collagen extracted from the various materials seems to be much the same, the initial relation or position of the collagen in the different connective tissues varies radically. Thus, collagen is readily dissolved by simple acid treatment of such collagen sources as fish swim bladder and rat tail tendon. On the other hand, only a relatively small percentage of collagen may be extracted by this procedure from animal skin.

Several possible explanations have been advanced for this difference in solubility or extent of extractability of collagen from various known collagen-containing materials. For example, it has been suggested that the collagen molecules may be embedded in relatively insoluble material which prevents the dissolving action which would bring the collagen into solution. Another explanation is that the collagen is actually linked in some chemical manner with insoluble components of the skin or other source material. Alternatively, it is suggested that collagen molecules are linked to other collagen molecules to form a chain or grouping of molecular weight such that it will not enter into solution. Also it is known (see my earlier U.S. Patent No. 2,631,942, of March 17, 1953, filed May 1, 1951), that a carbohydrate-containing compound designated as muco-protein but also known as glyco-protein, and substances similar to glyco-protein, may play a part in the formation of collagen fibers and by suitable control may even be employed to form an unusual, i.e., a long spacing, collagen fiber or if withheld may result in the formation of unstructured filaments when collagen is precipitated from solution. In purified skin collagen there is of the order of about 1% of carbohydrate and it has been tentatively supposed that this small amount of carbohydrate may be important in determining the lateral and longitudinal bonding of the elongate particles.

The above discussion will serve to indicate that the relationships involved in collagenous structures tending to hold collagen against solution are not fully understood and may be sharply different in different collagen source materials, and that the insolubility of the collagen content of certain materials may be the result of a variety of different kinds of linkages.

The uncertainties as to the precise nature of the linkages holding collagen against solution in skin material complicate the two fold problem of breaking such linkages while avoiding rupture of the collagen chain itself or conversion of the collagen material to gelatin or glue.

It is a feature of the present invention to extract a high proportion of the collagen from skins of animals in the form of relatively concentrated solutions from which the collagen may be reconstituted.

I have discovered that collagen may be extracted in acid soluble form from skin material by a process which includes the step of treating skin material with an enzyme to alter the forces holding the collagen in the skin. The treated skin is then leached with an aqueous solution which dissolves a high proportion of the collagen content of the skin material. The collagen in the solution thus obtained is precipitatable by known techniques such as salting out or by neutralization. For example, collagen fibers may be precipitated by adding sodium chloride to the collagen solution to a concentration of 0.2 to 2.0%, or by dialysis against such salt solutions.

In the process of the present invention, skin material is prepared for treatment by washing it to remove dirt and extraneous matter. Suitable skin material includes hides and skins of animals or the corium of such skins. The skin material may be in fresh, salted or frozen condition. For best results it is preferred to use skins of young animals such as calf skins. The skin material is usually chopped, cut or ground to divide it into fine particles for more effective and rapid handling.

The prepared skin material is then immersed in an aqueous solution containing enzyme material capable of acting on the skin to bring the collagen to soluble condition. The preferred enzyme material is a proteolytic enzyme fraction separated from pancreas. The enzyme material may be prepared by dispersing comminuted pancreas, for example from 5 to 15% by weight of dried whole pancreas powder in a 2% by weight solution of sodium chloride in water at a pH of from 4–5. The dispersion is kept cold suitably at a temperature from about 5° to about 15° C. for from 24 to 48 hours and is then filtered. Ammonium sulfate is added to the filtrate to the extent of about 20% of the amount of ammonium sulfate giving a saturated solution. After standing for about an hour, a precipitate forms which is removed by filtration and discarded. Further ammonium sulfate is added to the filtrate to bring the concentration to about 40% of that of a saturated solution. This solution is allowed to stand for about one hour. A further precipitate forms and this precipitate is separated by filtration and dialyzed against a large volume of cold water to remove ammonium sulfate. The product is dried without heating, for example by lyophilization.

This dried enzyme material is dissolved in water to form a solution for treating skin to improve the solubility of collagen. In general, good results have been obtained using from 0.2% to 2.0% by weight of the enzyme fraction in the aqueous solution. The skin is permitted to remain in the enzyme solution for at least fifteen minutes, preferably for from ½ to 4 hours, longer periods being used for the skins of older animals or for weaker enzyme solutions. The temperature is maintained at suitable incubating temperatures, i.e. temperatures sufficiently high for action by the enzyme but below the temperature at which the enzyme is inactivated or the collagen converted to gelatin. For incubation of calf skin with pancreatic enzyme fraction the preferred temperature is about 37° C. The pH is kept in the range at which the enzyme is active, for example from about pH 7 to about pH 9 by potassium bicarbonate, sodium bicarbonate or other conventional buffer which does not interact with the skin and is capable of maintaining this pH.

It is believed that the enzyme attacks linkages holding the collagen in insoluble form in the skin material. The exact nature of these linkages has not been established, but there are some indications that they may be peptide linkages either holding collagen molecules to insoluble protein matter or providing cross linkages between collagen molecules which prevent entry of individual collagen molecules into solution. This explanation is advanced as of possible assistance in understanding the invention but it is to be understood that the enzyme material is effective to bring a substantial portion of the collagen component of skin to acid-soluble form and that patentability is not predicated upon the accuracy of the explanation.

The enzyme treated skin in which the collagen has been solubilized is withdrawn from the enzyme solution and is thereafter subjected to extraction with an aqueous medium, preferably a weakly acidic aqueous solution providing a pH of from about 3 to about 4.5 and an ionic strength of below 0.5. For example a dilute solution such as 0.05% by weight solution of acetic acid is useful. Extraction is ordinarily carried out in the cold, e.g. 10° C., but may if desired be carried out at room temperatures. Extraction may be substantially complete in as little as one-half to one hour, but for convenience the extraction is usually allowed to proceed overnight. Agitation improves the rate of extraction although extraction will take place without it. A concentrated solution of collagen is obtained by filtering the extraction batch to remove undissolved material. The collagen content of the solution appears to be normal collagen and is capable of precipitation by techniques heretofore developed for the precipitation of acid soluble collagen from other sources.

The following example is given to aid in understanding the invention. It is to be understood that the invention is not limited to the particular materials, reagents or procedures set forth in the example:

*Example*

Fresh calf skin was washed with running cold water for about an hour to remove extraneous materials and was then run through a conventional meat grinder to reduce it to fine particles.

Fifty (50) grams of dried pancreas powder (Difco trypsin having activity such that one part will digest 250 times its weight of casein) is put in 500 ml. of 2% aqueous sodium chloride solution and allowed to stand in a refrigerator at about 5° to about 15° C. overnight. The suspension was then filtered and the filtrate adjusted to a pH of 4.80 using 5 N acetic acid. Ammonium sulfate was added to the solution to bring it to 20% saturation. This involved adding 11.2 grams of ammonium sulfate to each 100 ml. of the filtrate. This solution was allowed to stand at a temperature of about 10° C. for one hour. A precipitate formed was filtered off and discarded. Further ammonium sulfate was added to this filtrate to bring the concentration of ammonium sulfate to 40% of saturation. This concentration is obtained by adding 12.2 grams of ammonium sulfate to each 100 ml. of the filtrate. The solution was let stand for one hour. A precipitate was formed and separated by filtration, this filtrate being discarded.

The precipitate was resuspended in cold water and dialyzed against a large volume of cold water to separate ammonium sulfate. The product was dried by lyophilization to form a powder. Nine (9) grams of the prepared skin was then placed in 100 ccs. of a 1% by weight solution of the enzyme powder prepared as described above. The enzyme solution was buffered with 1% of potassium bicarbonate to maintain a pH of 7 to 8.

The enzyme solution with the skin material in it was heated to a temperature of 37° C. and held at this temperature for about 3 hours with occasional brisk agitation.

The treated skin material was then separated from the enzyme solution and washed with water. Thereafter the washed, enzyme-treated skin material was placed in about 350 ccs. of 0.05% aqueous solution of acetic acid, the pH of this solution being about 3.5. This solution was kept at about 10° C. and was agitated briskly from time to time. After standing overnight, a substantial proportion of the skin material was found to have dissolved and the solution was filtered to remove undissolved material. The resultant filtrate contained dissolved acid soluble collagen which was capable of precipitation as normal collagen fibers by conventional techniques.

This application is a continuation-in-part of my earlier filed application Serial No. 427,661, filed May 4, 1954, entitled "Extraction of Collagen," and now abandoned.

Having described my invention, what I claim as new and desired to secure by Letters Patent of the United States is:

1. A process for extracting collagen in soluble, reconstitutable form from skin material which comprises immersing the skin material in an aqueous solution containing the enzyme fraction salted out from a pH 4 to 5 aqueous extract of pancreas by ammonium sulfate by increasing the concentration of ammonium sulfate from an initial value of 20% of saturation to a final value of 40% of saturation, incubating the skin material in said solution at a pH in the range of 7 to 9 for at least ¼ of an hour at approximately 37° C. to break the linkages holding collagen against solution, removing said skin material from said solution before substantial degradation of the collagen and soaking the skin material in an aqueous extraction bath having a pH of 3 to 4.5 and an ionic strength below 0.5 to dissolve a high proportion of the collagen content of said skin material and to form a concentrated solution of acid soluble collagen.

2. A process for extracting collagen in soluble, reconstitutable form from skin material which comprises immersing the skin material in an aqueous solution having a pH in the range of 7 to 9 and containing from 0.2 to 2.0% by weight of the enzyme fraction salted out from a pH 4 to 5 aqueous extract of pancreas by ammonium sulfate by increasing the concentration of ammonium sulfate from an initial value of 20% of saturation to a final value of 40% of saturation, incubating the skin material in said solution for from ½ to 4 hours at approximately 37° C. to break the linkages holding collagen against solution, removing said skin material from said solution before substantial degradation of the collagen, and soaking the skin material in an aqueous acid solution having a pH of 3 to 4.5 and an ionic strength below 0.5 to dissolve a high proportion of the collagen content of said skin material.

3. A process for extracting collagen in soluble, reconstitutable form from calf skin which comprises comminuting the calf skin to form a finely divided skin material, immersing the skin material in an aqueous solution having a pH maintained by buffer salt in the range of 7 to 9 and containing from 0.2% to 2.0% of the enzyme fraction salted out from a pH 4 to 5 aqueous extract of pancreas by ammonium sulfate by increasing the concentration of ammonium sulfate from an initial value of 20% of saturation to a final value of 40% of saturation, incubating the skin material in said solution for from ½ to 4 hours at approximately 37° C. to break the linkages holding collagen against solution, removing said skin material from said solution before substantial degradation of the collagen and soaking the skin material in an 0.5% aqueous solution of acetic acid to dissolve a high proportion of the collagen content of said skin material.

References Cited in the file of this patent

Journal of American Leather Chem. Assoc., vol. 31, pages 93–103, (1936).
Chemical Abstracts, vol. 31, page 5203(6).
Chemical Abstracts, vol. 32, page 6902(9).
Chemical Abstracts, vol. 39, page 2298(9).
Laskowski: "Methods in Enzymology," vol. II, published by Academic Press Inc., New York, 1955, pages 26 to 30.